(12) United States Patent
Yoshida (10) Patent No.: US 8,137,226 B2
(45) Date of Patent: Mar. 20, 2012

(54) SILENT CHAIN

(75) Inventor: Yukio Yoshida, Nabari (JP)

(73) Assignee: BorgWarner Inc., Auburn Hills, MI (US)

( * ) Notice: Subject to any disclaimer, the term of this patent is extended or adjusted under 35 U.S.C. 154(b) by 451 days.

(21) Appl. No.: 12/518,541

(22) PCT Filed: Dec. 19, 2007

(86) PCT No.: PCT/JP2007/075220
§ 371 (c)(1),
(2), (4) Date: Jun. 10, 2009

(87) PCT Pub. No.: WO2008/075791
PCT Pub. Date: Jun. 26, 2008

(65) Prior Publication Data
US 2010/0016110 A1    Jan. 21, 2010

(30) Foreign Application Priority Data
Dec. 20, 2006 (JP) .................. 2006-342459

(51) Int. Cl.
F16G 13/06 (2006.01)
(52) U.S. Cl. .................................... 474/213
(58) Field of Classification Search ......... 474/206–218, 474/221, 231
See application file for complete search history.

(56) References Cited

U.S. PATENT DOCUMENTS

| | | | | |
|---|---|---|---|---|
| 1,115,431 A * | 10/1914 | Howson | ....................... | 474/213 |
| 5,203,745 A * | 4/1993 | Wang | ............................ | 474/206 |
| 5,902,203 A * | 5/1999 | Kanehira et al. | .............. | 474/213 |
| 6,190,277 B1 * | 2/2001 | Blase | ............................ | 474/218 |
| 6,406,394 B1 * | 6/2002 | Bubel et al. | ................... | 474/212 |
| 6,595,882 B2 * | 7/2003 | Bubel et al. | ................... | 474/212 |
| 6,743,134 B2 * | 6/2004 | Okabe et al. | ................... | 474/213 |
| 7,585,239 B2 * | 9/2009 | Miyazawa | ..................... | 474/157 |
| 7,789,782 B2 * | 9/2010 | Komada et al. | ............... | 474/206 |
| 2002/0128102 A1 * | 9/2002 | Bubel et al. | ................... | 474/212 |
| 2002/0160871 A1 * | 10/2002 | Okabe et al. | ................... | 474/212 |
| 2003/0233821 A1 * | 12/2003 | Matsuda | ............................ | 59/5 |
| 2005/0070389 A1 * | 3/2005 | Morishige | ..................... | 474/213 |
| 2010/0216580 A1 * | 8/2010 | Kabai et al. | ................... | 474/207 |

* cited by examiner

Primary Examiner — Michael Mansen
Assistant Examiner — Robert Reese (57) ABSTRACT

A silent chain that can reduce friction loss during travel of a chain. A silent chain 1 is configured by stacking a large number of link plates 2 comprising a pair of tooth parts 22 and pin holes 21 in the thickness direction and the lengthwise direction, and also arranging guide plates 4 on the outermost side of the link plates 2, and coupling the link plates 2 and the guide plates 4 by means of connecting pins 3. Protruding parts 45 which can come into sliding contact with guide parts 56B of a chain guide 56 and guide parts 57B of a tension arm 57 during travel of the silent chain 1 are provided on an outer side surface 4A of the guide plates 4. The contact between the silent chain 1 and the chain guide 56 and tension arm 57 is made to be point contact, and friction loss during travel of the chain can be reduced.

19 Claims, 6 Drawing Sheets

SILENT CHAIN

TECHNICAL FIELD

The present invention relates to a silent timing chain, and in particular to an improved structure for reducing friction loss during travel of the chain.

BACKGROUND ART

Silent chains are used as a timing chain in automobiles, motorcycles, and the like. The silent chain generally has a configuration in which a large number of link plates comprising respective pairs of tooth parts and pin holes are respectively coupled in a pivotable manner by connecting pins which are inserted into each pin hole, and also guide plates are arranged on the outermost side.

Furthermore, a chain guide for guiding the chain during travel of the chain is arranged on the tight side span of the silent chain, and a tensioner arm for maintaining suitable tension by removing slack in the chain is arranged on the slack side span. A pair of guide parts (or side wall parts) which are arranged on both sides of the chain in the width direction during travel of the chain are provided on the chain sliding surfaces of the chain guide and tension arm (see Japanese Unexamined Patent Application Publication H8-303541 and Japanese Unexamined Patent Application Publication 2006-112447).

During operation of the silent chain, the silent chain slides on and travels along the sliding surfaces of the chain guide and the tension arm, and at this time the outer side surfaces of the guide plates of the silent chain come into sliding contact with the guide parts of the chain guide and tension arm.

Accordingly, in conventional silent chains, the outer side surfaces of the guide plates come into sliding contact with the guide parts of the chain guide and tension arm during travel of the chain, whereby friction loss is generated.

On the other hand, there has been a strong demand for improved fuel consumption in the recent automobile industry in the light of saving climate. As a result, in the timing chains as well, improvements have been required in order to reduce a friction loss during travel.

The present invention has been made in view of such conventional circumstances and the problem which the present invention aims to resolve is to provide a silent chain which can reduce a friction loss during travel.

SUMMARY OF THE INVENTION

The present invention comprises a silent chain in which a large number of link plates comprising a pair of tooth parts and pin holes are stacked in the thickness direction and the lengthwise direction and are respectively coupled in a pivotable manner by connecting pins, and also guide plates are arranged on the outermost side At least one small protrusion which can come into sliding contact with the guide parts of a chain guide or a tension arm during travel of the silent chain is provided on the outer side surface of the guide plates.

Since a small protrusion is provided on the outer side surface of the guide plates, when the guide plates come into sliding contact with the guide parts of the chain guide or the tension arm during travel of the silent chain, the guide plates do not come into surface contact with the guide parts on their outer side surface, but come into point contact with the guide parts at the small protrusion. Thereby, a friction loss during travel of the chain can be reduced.

In addition, Japanese Unexamined Patent Application Publication 2000-320619 and Japanese Unexamined Patent Application Publication 2004-353865 disclose a guide plate with a protrusion. However, the protrusion disclosed in these publications is provided on the inner side surface of the guide plate, not on the outer side surface. The protrusion acts to widen a clearance between the guide plate and the outermost link plate to avoid a partial meshing state between the outermost link plate and a tooth surface of the sprocket.

Accordingly, the protrusion disclosed in the above-mentioned publications differs from the present invention in its purpose, configuration and operational effect.

There are several other embodiments and features of the present invention. The guide plate can comprise a generally rectangular guide plate without a toe part, and the small protrusion can be provided on the shoulder part or the back part on the outer side surface of the guide plate.

Also, the guide plate can be a guide plate with a toe part and a low rigidity, and the small protrusion can be provided at the tip end side of the toe part on the outer side surface of the guide plate.

The present invention includes a silent chain in which a large number of link plates comprising a pair of tooth parts and pin holes are stacked in the thickness direction and the lengthwise direction and are respectively coupled in a pivotable manner by connecting pins. At least one small protrusion which can come into sliding contact with the guide parts of a chain guide or a tension arm during travel of the silent chain is provided on the outer side surface of the outermost link plate, at the shoulder part or back part of the link plate.

The small protrusion which is provided at the shoulder part or back part on the outer side surface of the outermost link plate, when the outermost link plate comes into sliding contact with the guide parts of the chain guide or the tension arm during travel of the silent chain, the outermost link plate does not come into surface contact with the guide parts at its outer side surface, but comes into point contact with the guide parts at the small protrusion. Thereby, a friction loss during travel of the chain can be reduced.

The small protrusions can be provided one by one on opposite sides of the axis of symmetry of the guide plates or link plates in laterally symmetrical positions. Also, the small protrusion can be formed by press-forming the inside surface of the guide plates or link plates.

In the invention claimed in claim 6, the small protrusion is formed by press-forming the inside surface of the guide plates or link plates.

Further, the small protrusion can have a generally hemispherical shape or a truncated cone shape.

According to the silent chain of the present invention, since a small protrusion is provided on the outer side surface of the guide plate or outermost link plate, when the chain comes into sliding contact with the guide part of the chain guide or the tension arm during travel of the chain, the small protrusion on the guide plate or on the outermost link plate comes into point contact with the guide part, thereby reducing a friction loss during travel of the chain.

DESCRIPTION OF THE PREFERRED EMBODIMENTS

Figure 1:
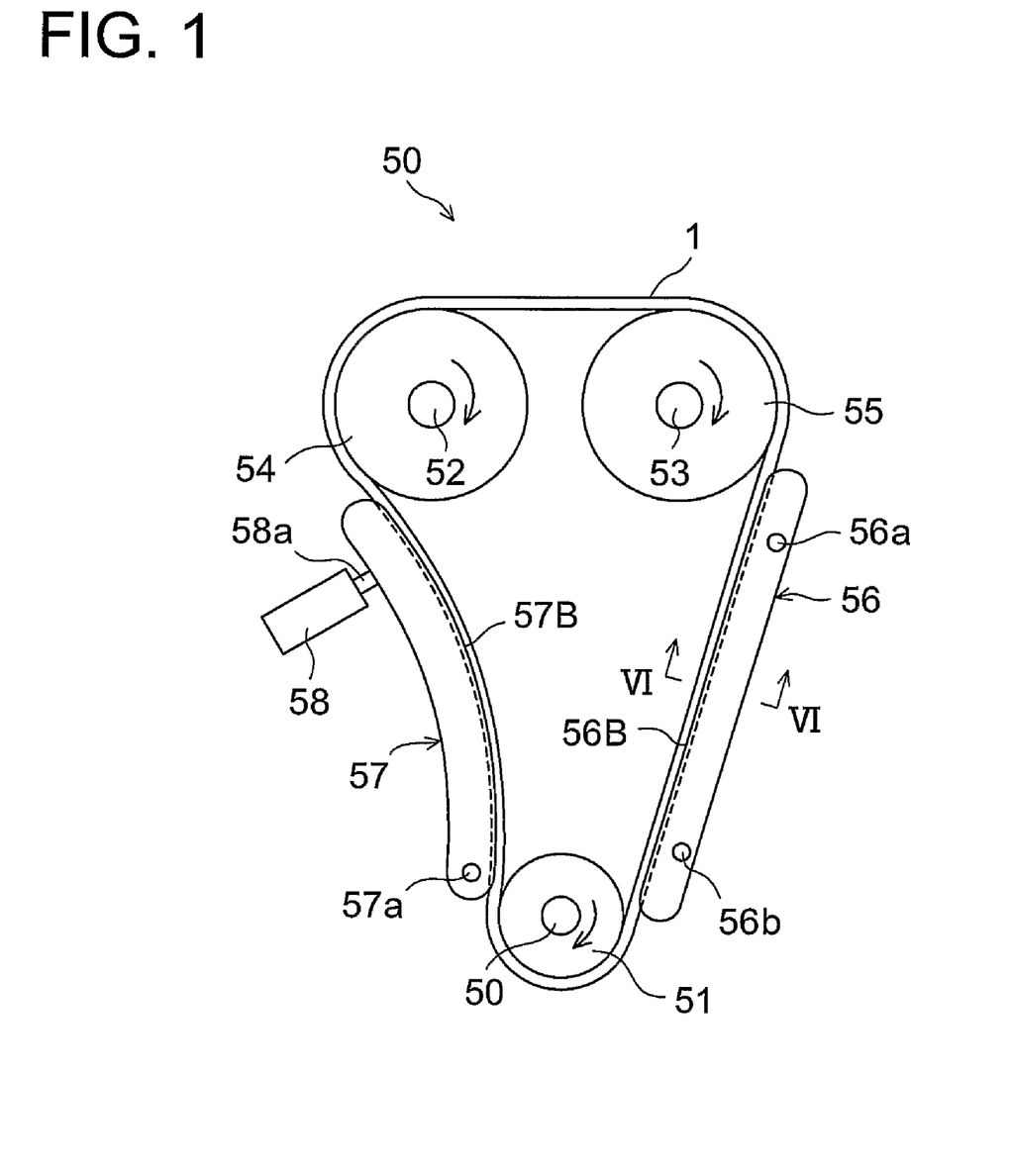
FIG. 1 is a schematic structural diagram of a camshaft timing system in an engine in which the silent chain of the present invention is employed.
Figure 2:
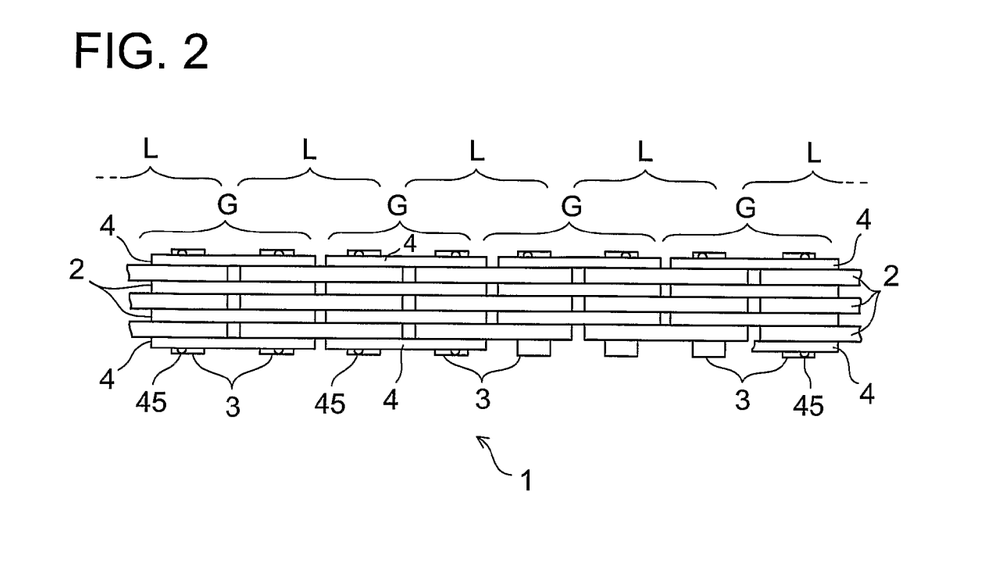
FIG. 2 is a partial plan view of the silent chain according to the first embodiment of the present invention.
Figure 3:
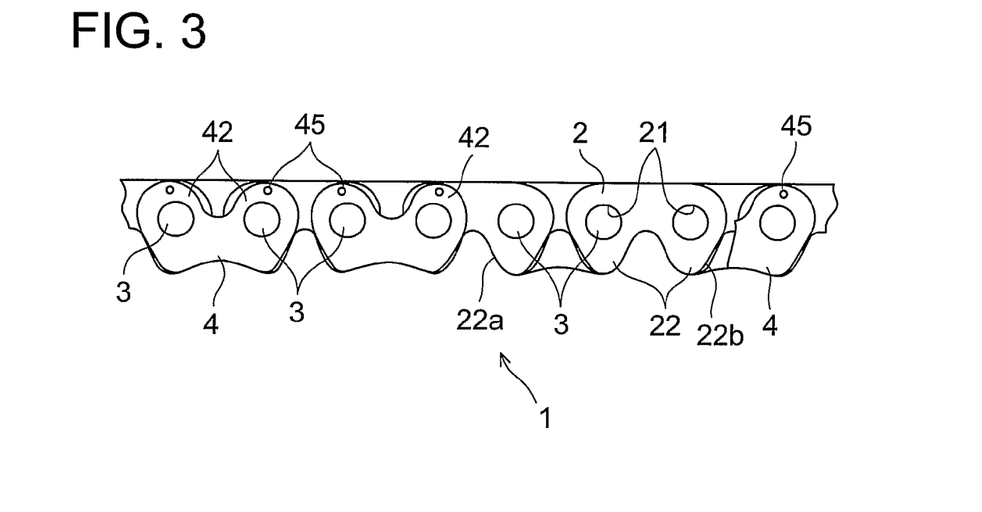
FIG. 3 is a partial front view of the silent chain of FIG. 2.
Figure 4:
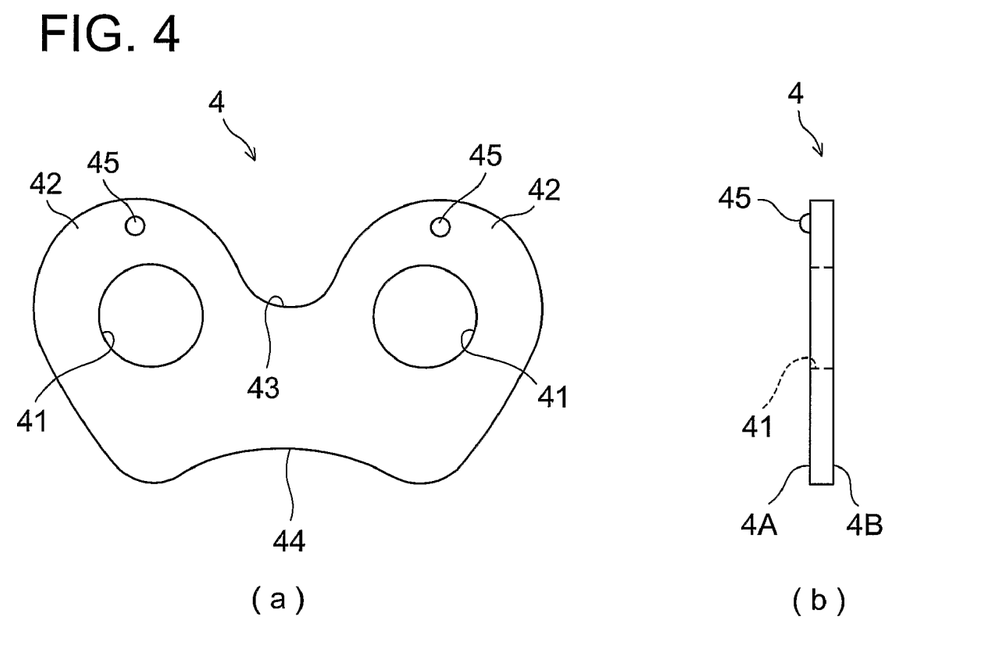
FIG. 4(a) is an enlarged front view of a guide plate which constitutes the silent chain of FIG. 2.
FIG. 4(b) is an enlarged side view thereof.
Figure 5:
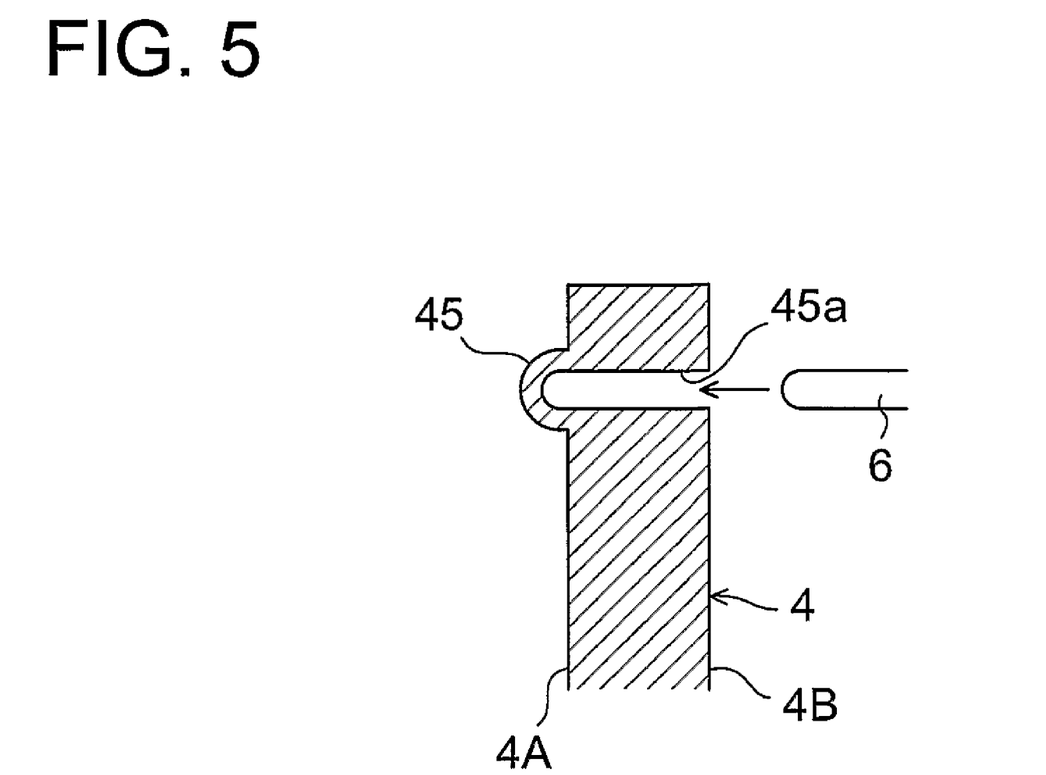
FIG. 5 is a schematic illustrating the process for forming the protruding part of the guide plates of FIG. 4.
Figure 6:
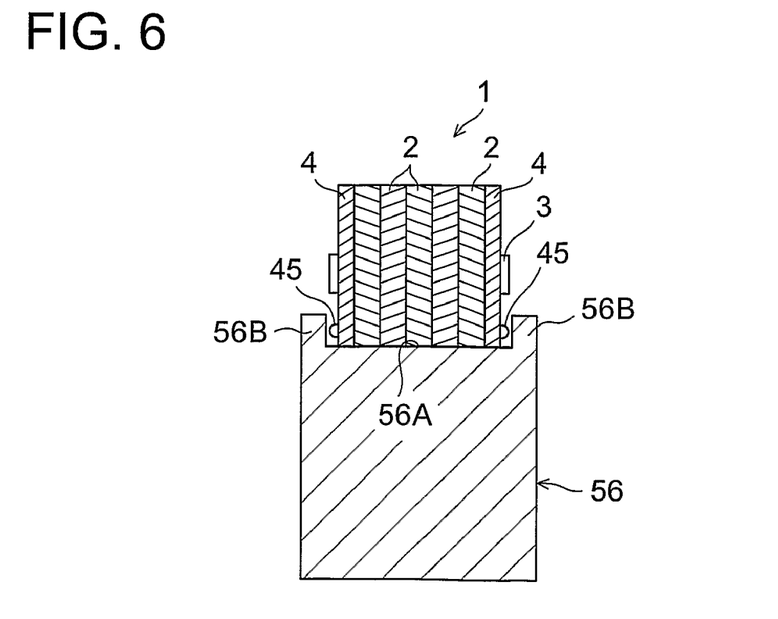
FIG. 6 is a schematic illustrating the state of sliding contact between the silent chain of FIG. 2 and the chain guide, which corresponds to the cross section taken along the line VI-VI of FIG. 1.

FIGS. 1 to 6 illustrate a silent chain according to the first embodiment of a present invention. FIG. 1 is a schematic structural diagram of an engine camshaft timing system employing the silent chain of the present invention; FIG. 2 is a partial plan view of the silent chain of the first embodiment of the present invention; FIG. 3 is a partial front view of the silent chain; FIG. 4(a) is an enlarged front view of a guide plate which constitutes the silent chain; FIG. 4(b) is an enlarged side view thereof; FIG. 5 illustrates the process for forming the protruding part of the guide plate; and FIG. 6 illustrates the state of sliding contact between the silent chain and the chain guide, which corresponds to the cross section taken along line VI-VI of FIG. 1.

As shown in FIG. 1, an engine camshaft timing system 50 employing a silent chain according to the present invention includes a crank sprocket 51 fitted to a crankshaft 50, cam sprockets 54, 55 respectively attached to two camshafts 52, 53, and a silent chain 1 wrapped around the sprockets 51, 54, 55. It should be noted that in FIG. 1 the arrow marks in the clockwise direction indicate the direction of rotation of each of the sprockets 51, 54, 55.

A chain guide 56 is arranged on the tight side span of the silent chain 1 to guide the chain 1 during its travel. The chain guide 56 is fixed to an engine component via fixing bolts 56a, 56b which are provided at opposite ends of the chain guide 56. A pair of guide parts (or side wall parts) 56B are provided with the chain guide 56, which are arranged on both the left and right sides of the chain 1 during travel of the chain.

A tension arm 57 is arranged on the slack side span of the silent chain 1 to maintain tension in the chain 1. The tension arm 57 is pivotably fitted to an engine component via a pivoting bolt 57a provided at the pivoting end thereof. A tensioner 58 is provided at the free end of the tension arm 57 to apply a pressing force to the tension arm 57. The tip end of a piston rod 58a of the tensioner 58 presses against the free end of the tension arm 57. A pair of guide parts (or side wall parts) 57B are provided with the tension arm 57, which are arranged on both the left and right sides of the chain 1 during travel of the chain 1.

As shown in FIGS. 2 and 3, the silent chain 1 is configured in such a manner as to interlace a large number of link plates 2 in the thickness direction (i.e. the vertical direction in FIG. 2) and the lengthwise direction (i.e. the lateral direction in the figure), coupling the link plates 2 respectively in a pivotable manner by connecting pins 3, and arranging guide plates 4 on the outermost side of the link plates 2.

The silent chain 1 comprises a plurality of guide rows G composed of link plates 2 arranged in the same lengthwise position as the guide plates 4 and the guide plates 4, and a plurality of link rows L composed of only the link plates 2 arranged between the adjacent guide rows G in the lengthwise direction. Each of the guide rows G and the link rows L is arranged alternately in the lengthwise direction.

The link plate 2 has a pair of pin holes 21 and tooth parts 22. The connecting pins 3 are inserted into each of the pin holes 21. Each tooth part 22 is respectively configured from an inner side flank surface 22a and an outer side flank surface 22b which mesh with a sprocket tooth (not shown).

The guide plate 4 is a guide plate of a low rigidity. As shown in FIG. 4(a), the guide plate 4 has a pair of pin holes 41 and toe parts 42, a crotch part 43 formed between the toe parts 42, and a back part 44. The end part of the connecting pin 3 is inserted into and fixed to each of the pin holes 41. The crotch part 43 preferably extends downwardly past the upper edge part of each pin hole 41. The back part 44 has a concave shape.

Hemispherical protruding parts 45 (see FIG. 4(b)) are provided on the tip end side of the toe parts 42 on the outer side surface 4A of the guide plate 4. The protruding part 45 is provided on opposite sides of the axis of symmetry of the guide plate 4 one by one in laterally symmetrical positions. The protruding parts 45 are adapted to come into sliding contact with the guide parts 56B of the chain guide 56 and the guide parts 57B of the tension arm 57 during travel of the silent chain 1. As shown in FIG. 3, the guide plates 4 are assembled in the silent chain 1 with the toe parts 42 oriented upwardly and the inner side surfaces 4B facing the outermost link plates 2.

As shown in, for example, FIG. 5, the hemispherical protruding part 45 of the guide plate 4 is formed by press-forming the inner side surface 4B of the guide plate 4 using a pin 6 of circular cross section. In this case, a blind hole 45a due to press-forming is formed inside the guide plate 4. It should be noted that the protruding part 45 is not limited to a hemispherical shape, and it may take the shape of a truncated cone which tapers to a smaller radius toward the tip end.

The operational effect of this embodiment will be hereinafter explained.

During operation of the silent chain 1, the silent chain 1 slides and travels on the chain guide 56 and the tension arm 57.

Here, the state of contact between the silent chain 1 and the chain guide 56, with the aid of FIG. 6 will be given in FIG. 6. As shown in this drawing, the chain guide 56 has a chain sliding surface 56A on which the back part of the link plates 2 of the chain 1 slide. The pair of guide parts (or side wall parts) 56B are formed on opposite lateral side edge parts of the chain sliding surface 56A, which extend along and are upraised from the chain sliding surface 56A.

As shown in FIG. 6, when the silent chain 1 contacts the chain sliding surface 56A of the chain guide 56, the protruding parts 45 on each guide plate 4 arranged on the outermost side of the chain 1 are disposed opposite the guide parts 56B of the chain guide 56, and a predetermined clearance is formed between each of the guide parts 56B and the protruding part 45.

When the silent chain 1 slides and travels on the chain sliding part 56A of the chain guide 56, the protruding parts 45 of the guide plates 4 on the outermost side of the chain come into point contact with the guide parts 56B. Thereby, a friction loss can be reduced during travel of the chain 1, compared with a conventional silent chain in which the outer side surface of the guide plates comes into surface contact with the guide parts of the chain guide.

Though this is not shown in the figures, the protruding parts 45 of the guide plates 4 on the outermost side of the chain also come into point contact with the guide parts 57B when the silent chain 1 slides over the chain sliding surface of the tension arm 57. Thereby, a friction loss can be further reduced during travel of the chain.

Although in the first embodiment, a guide plate with a low rigidity and toe part was shown by way of example of the guide plate 4, the present invention can be applied to a guide plate of a generally rectangular shape without toe parts. In this case, the protruding parts provided on the outer side surface of the guide plates are arranged on both the left and right shoulder parts or both the left and right ends of the back part of the guide plate, on the opposite side to the sprocket meshing side of the silent chain. Alternatively only one protruding part is provided at the center of the back part of the guide plate.

Figure 7:
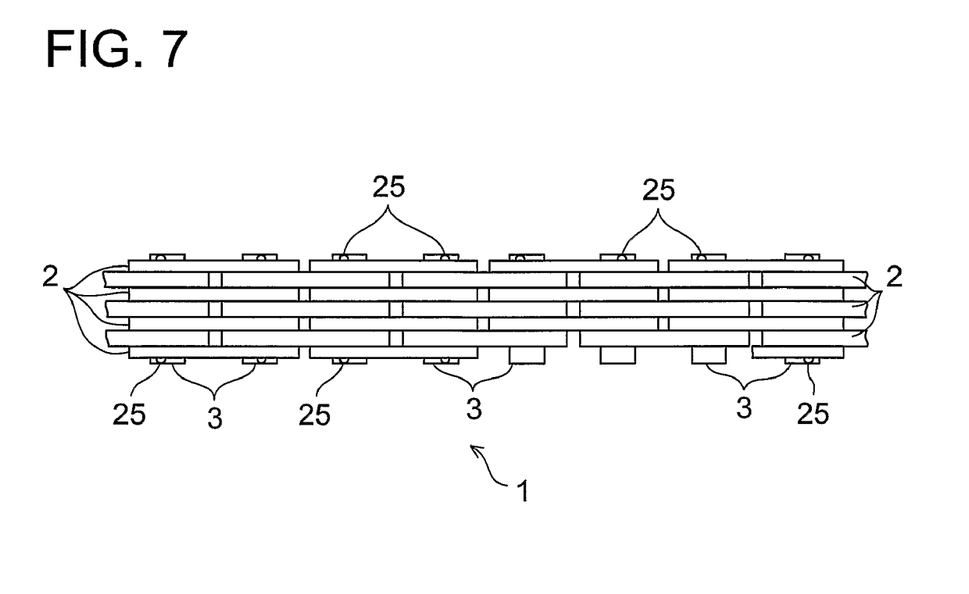
FIG. 7 is a partial plan view of the silent chain according to another embodiment of the present invention.
Figure 8:
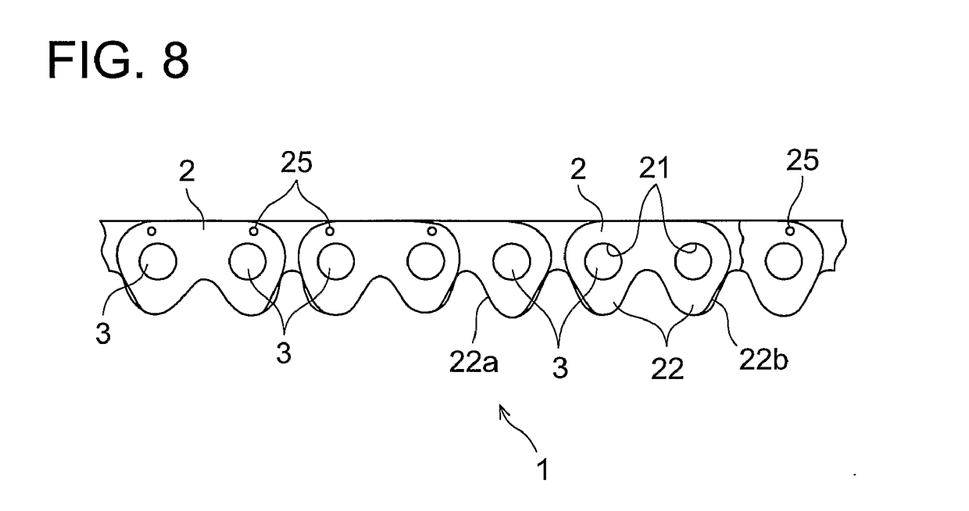
FIG. 8 is a partial front view of the silent chain of FIG. 7.
Figure 9:
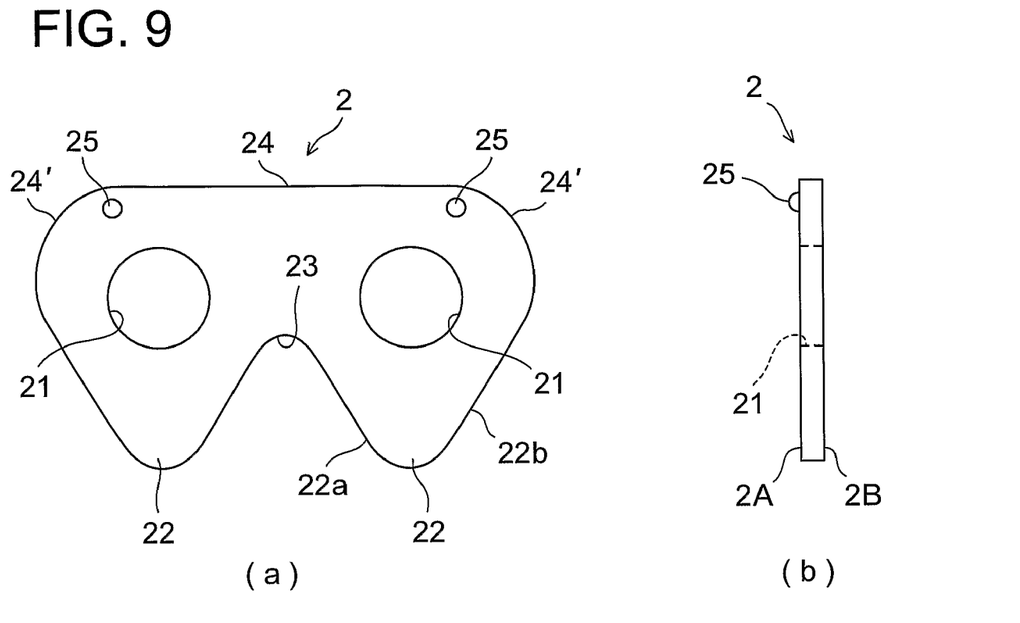
FIG. 9(a) is an enlarged front view of the outermost link plate which constitutes the silent chain of FIG. 7.
FIG. 9(b) is an enlarged side view thereof.
Figure 10:
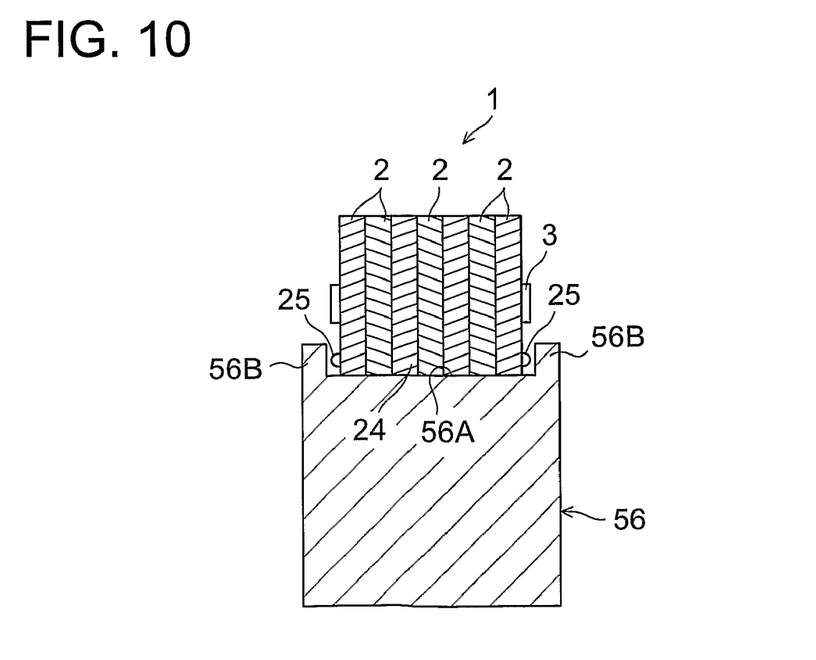
FIG. 10 is a schematic for illustrating the state of sliding contact between the silent chain of FIG. 7 and the chain guide, corresponding to the cross section taken along the line VI-VI of FIG. 1.

FIG. 7 is a partial plan view of the silent chain according to a second embodiment of the present invention; FIG. 8 is a partial front view of the silent chain; FIG. 9(*a*) is an enlarged front view of the outermost link plate which constitutes the silent chain; FIG. 9(*b*) is an enlarged side view thereof; and FIG. 10 illustrates the state of sliding contact between the silent chain and the chain guide, which corresponds to the cross section taken along line VI-VI of FIG. 1. It should be noted that in these drawings symbols which are the same as those in the first embodiment described above denote like or corresponding components.

In this second embodiment, no guide plates are provided on the outermost side of the chain. As shown in FIGS. 7 to 9, hemispherical protruding parts 25 are provided in positions at both the left and right ends of the back part 24 or on both the left and right shoulder parts 24' of the link plates 2, on the outer side surface 2A of the outermost link plates 2. The protruding part 25 is provided one by one on opposite sides of the axis of symmetry of the link plates in laterally symmetrical positions. The protruding parts 25 are adapted to come into sliding contact with the guide parts 56B of the chain guide 56 and the guide parts 57B of the tensioner arm 57 during travel of the silent chain 1. In addition, only one protruding part 25 may be provided at the center of the back part 24 of the link plate 2.

The protruding part 25 is formed, for example, by press-forming similar to the first embodiment described above. Also, the protruding part 25 is not limited to a hemispherical shape, and it may take the shape of a truncated cone which tapers to a smaller radius toward the tip end.

In this case as well, during operation of the silent chain 1, the silent chain 1 slides and travels over the chain guide 56 and the tension arm 57. At this time, as shown in FIG. 10, when each back part 24 of the link plates 2 of the silent chain 1 contacts the chain sliding surface 56A of the chain guide 56, the protruding parts 25 on each link plate 2 arranged on the outermost side of the chain are respectively disposed opposite the guide parts 56B of the chain guide 56. A predetermined clearance is formed between the guide parts 56B and the protruding parts 25.

When the silent chain 1 slides and travels over the chain sliding surface 56A of the chain guide 50, the protruding parts 25 of the link plates 2 on the outermost side of the chain come into point contact with the guide parts 56B. By virtue of this, a friction loss during travel of the chain can be reduced.

Though this is not shown in the figures, when the silent chain 1 slides over the chain sliding surface of the tension arm 57, the protruding parts 25 of the link plates 2 on the outermost side of the chain also come into point contact with the guide parts 57B. Thereby, a friction loss can be further reduced during travel of the chain.

While preferred embodiments of the present invention have been shown and described herein, numerous variations and alternative embodiments will occur to those skilled in the art. Accordingly, it is intended that the invention is not limited to the preferred embodiments described herein but instead limited to the terms of the appended claims.

The invention claimed is:

1. A silent chain comprising a plurality of link plates comprising a pair of tooth parts and pin holes are stacked in the thickness direction and the lengthwise direction and are respectively coupled in a pivotable manner by connecting pins, and also guide plates are arranged on the outermost side,
    said silent chain being characterized in that at least one small protrusion which is configured to come into sliding contact with a guide part of a chain guide or tension arm during travel of said silent chain is provided on the outer side surface of the abovementioned guide plates.

2. The silent chain as claimed in claim 1, in which the abovementioned guide plates are characterized in that the at least one of the small protrusion is provided on the shoulder part or the back part on the outer side surface of said guide plates.

3. The silent chain as claimed in claim 2, characterized in that one of the at least one small protrusions is provided on each side of the axis of symmetry of the abovementioned guide plates or link plates in laterally symmetrical positions.

4. The silent chain as claimed in claim 2, characterized in that the at least one small protrusion is formed by press-forming the inside surface of the abovementioned guide plates or link plates.

5. The silent chain as claimed in claim 2, characterized in that the at least one small protrusion has a generally hemispherical shape or a truncated cone shape.

6. The silent chain as claimed in claim 1, in which the abovementioned guide plates are guide plates of low rigidity which have toe parts, characterized in that the at least one of the small protrusion is provided at the tip end side of the abovementioned toe parts on the outer side surface of said guide plates.

7. The silent chain as claimed in claim 6, characterized in that one of the at least one small protrusions is provided on each side of the axis of symmetry of the abovementioned guide plates or link plates in laterally symmetrical positions.

8. The silent chain as claimed in claim 6, characterized in that the at least one small protrusion is formed by press-forming the inside surface of the abovementioned guide plates or link plates.

9. The silent chain as claimed in claim 6, characterized in that the at least one small protrusion has a generally hemispherical shape or a truncated cone shape.

10. The silent chain as claimed in claim 1, characterized in that one of the at least one small protrusions is provided on each side of the axis of symmetry of the abovementioned guide plates or link plates in laterally symmetrical positions.

11. The silent chain as claimed in claim 10, characterized in that the at least one small protrusion is formed by press-forming the inside surface of the abovementioned guide plates or link plates.

12. The silent chain as claimed in claim 10, characterized in that the at least one small protrusion has a generally hemispherical shape or a truncated cone shape.

13. The silent chain as claimed in claim 1, characterized in that the at least one small protrusion is formed by press-forming the inside surface of the abovementioned guide plates or link plates.

14. The silent chain as claimed in claim 13, characterized in that the at least one small protrusion has a generally hemispherical shape or a truncated cone shape.

15. The silent chain as claimed in claim 1, characterized in that the at least one small protrusion has a generally hemispherical shape or a truncated cone shape.

16. A silent chain comprising a plurality of link plates comprising a pair of tooth parts and pin holes are stacked in the thickness direction and the lengthwise direction and are respectively coupled in a pivotable manner by connecting pins, said silent chain being characterized in that at least one small protrusion is configured to come into sliding contact with a guide part of a chain guide or a tension arm during travel of said silent chain is provided on the outer side surface of the outermost link plate, at the shoulder part or back part of said link plate.

17. The silent chain as claimed in claim 16, characterized in that one of the at least one small protrusions is provided on each side of the axis of symmetry of the abovementioned guide plates or link plates in laterally symmetrical positions.

18. The silent chain as claimed in claim 16, characterized in that the at least one small protrusion is formed by press-forming the inside surface of the abovementioned guide plates or link plates.

19. The silent chain as claimed in claim 16, characterized in that the at least one small protrusion has a generally hemispherical shape or a truncated cone shape.

* * * * *